N. SCHACHTER.
SHOCK ABSORBER SPRING AND BLANK THEREFOR.
APPLICATION FILED SEPT. 8, 1919.
1,352,540.
Patented Sept. 14, 1920.
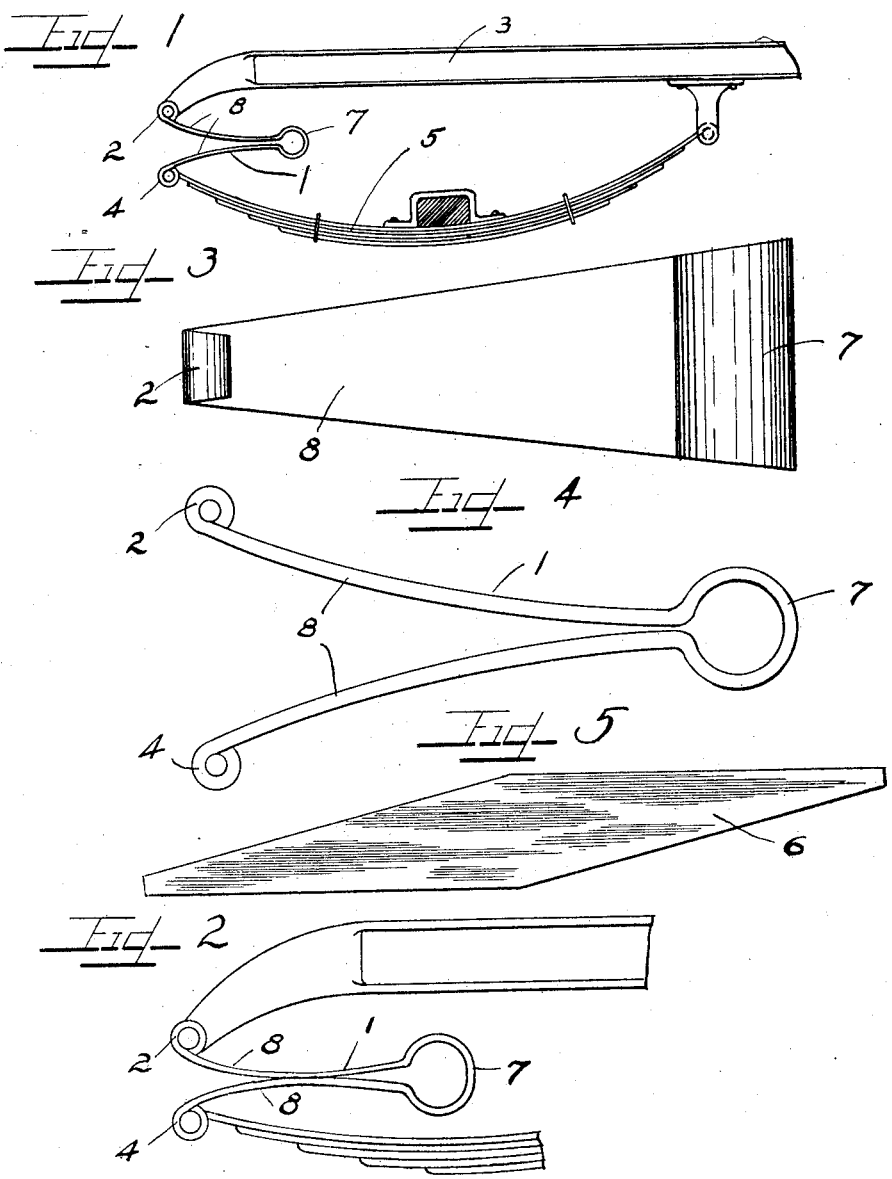

UNITED STATES PATENT OFFICE.

NATHAN SCHACHTER, OF CHICAGO, ILLINOIS.

SHOCK-ABSORBER SPRING AND BLANK THEREFOR.

1,352,540.  Specification of Letters Patent.  Patented Sept. 14, 1920.

Original application filed February 11, 1918, Serial No. 216,526. Patent No. 1,331,677, dated February 24, 1920. Divided and this application filed September 8, 1919. Serial No. 322,360.

*To all whom it may concern:*

Be it known that I, NATHAN SCHACHTER, a citizen of the United States, and a resident of the city of Chicago, in the county of Cook and State of Illinois, have invented certain new and useful Improvements in Shock-Absorber Springs and Blanks Therefor; and I do hereby declare that the following is a full, clear, and exact description of the same, reference being had to the accompanying drawings and to the numerals of reference marked thereon, which form a part of this specification.

This invention relates to plate springs and blanks for the manufacture of such springs which are particularly adapted to serve as shock absorber springs for vehicles and similar purposes.

This application is a divisional of my copending application, Serial No. 216,526, filed February 11, 1918.

An object of the invention is to provide a spring and a blank for making such a spring which will effectively restrict the movement of the parts so as to move only in the direction in which they are adapted to yield and will provide the desired resiliency and which may be cut from stock with a very small percentage of waste.

Other and further important objects of this invention will be apparent from the disclosures in the drawings and specification.

The invention (in a preferred form) is illustrated in the drawings and hereinafter more fully described.

On the drawings:

Figure 1 is a fragmentary side elevation of a chassis and spring between which an absorber spring embodying the invention is inserted.

Fig. 2 is a view similar to Fig. 1 showing the absorber spring in compression.

Fig. 3 is a plan view of the absorber spring.

Fig. 4 is a side elevation of the absorber spring.

Fig. 5 is a plan view of the blank from which the absorber spring is manufactured.

As shown on the drawings:

The absorber spring 1 is shown attached at one end, 2, to one end of the side frame members 3 of a chassis and at the other end 4 to the adjacent main spring of the vehicle.

The blank 6 from which the shock absorber spring is formed may be produced in any convenient way, such as cutting a strip of sheet steel along diagonal parallel lines and then trimming off the tips of the diamond shaped blanks so made.

The blank is then subjected to operations by suitable dies which shape the center or wide portion of the blank in a somewhat large circular form shown at 7 which is capable of expansion or contraction while the ends 8 are bent outwardly on curved diverging lines and further the extreme ends thereof are bent to form the loops 2 and 4 by which the spring is attached to the chassis 3 and main spring 5 respectively.

The circular portion 7 of the spring does not form a complete circle but there is a gap between the arms 8 adjacent the loop 7, which gap gradually widens toward the outer ends of the arms 8. With this construction the compression or approximation of the outer ends of the arms 8 acts to contract the large circular portion 8 of the spring until the inner ends of the arms adjacent the ring 7 are closed. Further movement of the outer ends of the arms 8 toward each other tends to produce a separation of the inner ends of these arms thereby again expanding the ring 7 in the manner indicated in Fig. 2.

It is an important feature of this spring construction that the two arms 8 taper to their extremities and are proportioned so that the loop 7 will be sufficiently strong to offer the desired initial resistance, and the taper arms have sufficient elasticity so that if the loop 7 has been closed the compression is resisted with gradually increasing force after the point of contact between the arms approaches the outer ends of the spring.

If the arms 8 of the spring are of uniform width or improperly tapered, they will not have the desired resiliency to gradually resist the shock, but will offer an abrupt resistance when the inner ends thereof are pressed together. The widened center portion or bight of the spring also serves to hold the arms 8 of the spring in the proper relative position for movement to and from each other, and prevents twisting or relative movement transversely of their width, which might occur if the central portion of the spring was not comparatively wide.

While I have shown my spring constructed in a certain form and produced by the performance of certain operations, I wish it to be understood that I contemplate various changes and modifications and do not propose to limit the patent granted hereon otherwise than as necessitated by the appended claims.

I claim as my invention:

1. A shock absorber spring consisting of an elongated diamond shaped blank folded transversely so as to have an open circular bight portion, and similar, divergently curved tapered arms, and attaching means at the outer end of each arm.

2. A shock absorber spring consisting of an elongated diamond shaped blank folded along its minor axis so as to have an elongated cylindrical bight portion, and similar, divergently curved tapered arms having the outer ends folded into a loop to provide means for attachment.

In testimony whereof I have hereunto subscribed my name in the presence of two subscribing witnesses.

NATHAN SCHACHTER.

Witnesses:
 CHARLES W. HILL, Jr.,
 EARL M. HARDINE.